United States Patent [19]

Troesch et al.

[11] Patent Number: 4,543,128

[45] Date of Patent: Sep. 24, 1985

[54] FILLERS DYED WITH POLYCATIONIC DYESTUFFS USEFUL FOR COLORING PAPER AND NON-WOVEN FABRICS

[75] Inventors: Juerg Troesch, Allschwil; Walter Portmann, Gelterkinden, both of Switzerland

[73] Assignee: Sandoz Ltd., Basel, Switzerland

[21] Appl. No.: 525,834

[22] Filed: Aug. 23, 1983

Related U.S. Application Data

[63] Continuation-in-part of Ser. No. 482,175, Apr. 5, 1983, abandoned.

[30] Foreign Application Priority Data

Apr. 5, 1982 [DE] Fed. Rep. of Germany ....... 3212635
Aug. 28, 1982 [DE] Fed. Rep. of Germany ....... 3232110

[51] Int. Cl.$^4$ .......................... C09D 11/00; C08J 3/00; C08K 5/34
[52] U.S. Cl. .................................. 106/23; 106/193 D; 106/214; 8/625; 8/632; 8/654; 524/88; 524/236
[58] Field of Search ................. 106/288 Q, 23, 193 D, 106/214, 308 N; 8/647, 625, 632; 524/88, 236

[56] References Cited

U.S. PATENT DOCUMENTS

| | | | |
|---|---|---|---|
| 3,597,304 | 8/1971 | Baldwin et al. | 8/625 |
| 3,839,426 | 10/1974 | Jefferies | 106/288 Q |
| 3,934,973 | 1/1976 | Schultz et al. | 8/632 |
| 3,996,179 | 12/1976 | Haus et al. | 106/23 |
| 4,046,502 | 9/1977 | Moser | 8/654 |
| 4,057,388 | 11/1977 | Defago et al. | 8/632 |
| 4,382,800 | 5/1983 | Wang et al. | 8/647 |

FOREIGN PATENT DOCUMENTS

2126258 3/1984 United Kingdom ................... 8/625

OTHER PUBLICATIONS

Colour Index 3rd Ed., vol. 4, The Society of Dyers and Colourists; p. 4040.

*Primary Examiner*—Theodore Morris
*Attorney, Agent, or Firm*—Gerald D. Sharkin; Richard E. Vila; Thomas C. Doyle

[57] ABSTRACT

Coloring compositions comprising an aqueous paste or dispersion of a filler which has been dyed with a water-soluble polycationic dyestuff, preferably together with a binding agent, are used in the coating of paper and the fixing, dyeing and printing of non-woven fabrics, including tissue paper.

28 Claims, No Drawings

FILLERS DYED WITH POLYCATIONIC DYESTUFFS USEFUL FOR COLORING PAPER AND NON-WOVEN FABRICS

This application is a continuation-in-part of our copending application Ser. No. 482 175, filed on Apr. 5, 1983, now abandoned.

In the preparation of paper it is common practice to use fillers which are generally white inorganic pigments. Such papers are frequently dyed, for example with direct, acid or basic dyestuffs. Direct dyes are used predominantly for dyeing of paper which is woodfree or has a low wood content, whereas basic dyes are suitable for dyeing paper of high wood content. It is desirable for the dye to bind as strongly as possible to the paper fibres, to avoid subsequent bleeding of the colour.

Fillers may be added to the pulp from which the paper is made, but high quality papers are often coated with a composition comprising an aqueous paste of filler together with a binding agent, for example starch or a synthetic resin, and optionally a dispersing agent. For coated paper, a further method of colouring the paper is to apply to it a coloured coating composition, generally containing one or more coloured pigments either as sole filler or together with a white pigment. However when a mixture of white and coloured pigments is used, these pigments frequently migrate to different extents during the drying process, which can lead to non-level dyeings. Furthermore, the use of pigments is less efficient than that of soluble dyes, particularly for deep shades.

It is known to add water-soluble dyestuffs to coating compositions containing a white pigment such dyestuffs not being substantive to the filler. This gives a number of disadvantages, however, particularly for high quality paper. This is particularly due to insufficient exhaust of the dye on to the substrate, leading to unsatisfactory fastness properties. Quite generally, for any water-soluble dyes used together with white pigments, the differences in migration properties, particularly when a mixture of dyes is used, lead to non-level dyeings and variations in depth. In addition, particularly with basic dyes, light fastness is poor; and the addition of cationic dyes to an anionically stabilized coating system often causes precipitation.

Nonwoven fabrics are flexible, porous, two dimensional structures which generally consist of textile fibres laid down in random directions. The random web of fibres may be prefixed by mechanical means such as needling and then fixed, usually with a binder or alternatively by partial solution or melting of the fibres, or by a combination of these techniques.

Paper is similar to a nonwoven fabric, in that it is prepared as a fine random web of fibres (cellulose fibres instead of textile fibres). Normal paper may be pressed, sized and coated, whereas tissue paper resembles nonwoven fabrics more closely in that it is often fixed by mechanical means such as embossing or creping, possibly followed by the use of a binder. In this specification, the terms "nonwoven fabrics" or "non-wovens" will be taken to include tissue paper.

In the preparation of non-wovens in which the web is fixed with an aqueous dispersion of a binding agent, colouring is usually achieved by mixing organic or inorganic pigments with the binder dispersion. Similarly, finished non-wovens are generally coloured by printing or impregnating with printing inks or pastes containing organic or inorganic pigments.

If the binding agent dispersion contains fillers such as kaolin and chalk as well as the coloured pigments, which is often the case in the manufacture of artificial leather on the basis of a non-woven fabric, then the white filler and the coloured pigment tend to separate from each other in the impregnation process, giving rise to poor levelness, shade variations and poor colour yield.

Similarly, when in printing inks or pastes, mixtures of differently coloured pigments are used to obtain particular shades, the individual pigments tend to migrate to different extents when the printed or impregnated substrate is dried, leading to variations in shade and poor levelness.

A further disadvantage of the use of organic or inorganic pigments as colouring agents is that the resulting non-wovens are not bleachable, or bleachable only with difficulty, which causes problems in the recycling of such materials.

If water-soluble dyestuffs are used for the dyeing or printing of non-woven fabrics, the resulting dyeings and printings do not meet the fastness requirements for many applications. In particular the bleeding fastness in water, alcohol, milk and soap solution as well as the light fastness are frequently inadequate. Furthermore the same problems of differential migration during drying occur as when coloured pigments are used.

It has now been found that the disadvantages caused by differential migration as well as the other disadvantages outlined above may largely be overcome for both coated paper and for non-wovens when white pigments (filler) dyed with polycationic dyestuffs are used as colouring agents. Particularly good results can be obtained by the use of selected groups of polycationic dyestuffs.

Accordingly, the present invention provides a coloured composition comprising an aqueous paste or dispersion of a filler which has been dyed with a water-soluble polycationic dyestuff. Preferably, the composition according to the invention also contains a binding agent, preferably in amounts between 2% and 20% by weight of the total composition.

Suitable fillers may be organic, for example urea/formaldehyde condensation products such as the commercially available products Pergopak ® (Ciba-Geigy) or Lytron ® (Monsanto), but are preferably inorganic. Preferably the filler is a white inorganic pigment. Examples are finely divided silicates, e.g. kaolin (China-clay), talc (soapstone), diatomite (kieselguhr or filter earth), french chalk, asbestine, calcium silicate (obtainable in particularly suitable form by mixing cold concentrated $CaCl_2$ solution with cold concentrated sodium silicate solution), quarz sand and asbestos; sulphates e.g. gypsum, annaline, lenzine, satin white (calcium sulphoaluminate), heavy spar and permanent white (both $BaSO_4$); carbonates e.g. calcium carbonate (e.g. chalk), magnesite, whiterite, white lead, dolomite and calamine; oxides or hydroxides e.g. alumina, bayrites, titanium dioxide, slaked lime, burned magnesia and zinc white; sulphides e.g. lithopone and zinc sulphide; and sulphites e.g. calcium sulphite. Preferred fillers for dyeing with cationic dyes are kaolin, calcium carbonate, talc, permanent white and titanium dioxide, especially kaolin, calcium carbonate and talc. It is surprizing that even cheap fillers such as chalk give excellent results, particularly with the selected groups of cationic dyes.

By polycationic dyestuffs is meant dyestuffs having at least 1.3 cationic groups (quaternary or protonated nitrogen atoms) per dye molecule, whereby a non-integral number of cationic groups is to be understood as an average value for the molecules of the dyestuff in question. The dyestuffs may also contain anionic groups, particularly sulphonic acid groups, but if any such are present, then the number of cationic groups per molecule must be at least one greater than the number of anionic groups per molecule. Expressed numerically, if there are x cationic and y anionic groups per molecule, then $x \geq 1.3$ and $0 \leq y \leq (x-1)$. More preferably the dyestuffs are biscationic.

The dyes may be metallized or metal free, but metal complex dyes are preferred, more preferred being 1:1 and 1:2 metal complex azo dyes. For 1:2 complexes, containing two dyestuff units per metal atom, the requirement of at least 1.3 cationic groups per molecule applies to each dyestuff unit and not to each molecule of complex. As well as azo dyes, other cationic dyes, for example phthalocyanine (preferably copper phthalocyanine) dyes and anthraquinone dyes may be used. Dyes containing a fibre-reactive group may also be employed.

Preferably the dyes have, as the metal-free cation, a molecular weight of at least 400, more preferably 500–1000. They are substantive to the filler to be used, and preferably they exhaust from an aqueous solution containing 1% dyestuff, based on the weight of filler, on to the filler, at 20°–90° C. and without the use of dyeing assistants, to an extent of at least 90%. More preferred dyes are those which give a high degree of exhaust on cotton, as measured by the following test: the dye should give an exhaust ratio (ratio of dye exhausted on to substrate to total dye in bath) of 90–100% as defined by DIN 54000 or ISO RIOS/I 1959, part 1, when dyed on to mercerised cotton at 1/1 standard depth from a boiling aqueous electrolyte-free bath at 20:1 liquor to goods ratio, dyeing time 90 minutes.

Dyestuffs meeting these conditions are predominantly those having peripheral or terminal cationic groups in the molecule. One preferred group of dyestuffs are phthalocyanine dyestuffs containing two or more cationic groups which are attached to the periphery of the planar phthalocyanine ring system. A further preferred group of dyestuffs have a substantially linear structure comprising three or more homo- or heteroaromatic rings or fused ring systems joined directly or by bridging groups in such a way that there are two terminal rings or ring systems and one or more medial rings or ring systems, there being on average at least 1.3 cationic groups per molecule attached to terminal rings or ring systems, and none elsewhere. In a more preferred group there are two or more, preferably two cationic groups per molecule, one or more, preferably one on each terminal ring or ring system and none elsewhere.

Dyestuffs having the above properties and structural features are known in the art, and are disclosed for example in the following published patents and patent applications: German published applications Nos. 1 061 010, 1 064 661, 1 621 702, 2 250 676, 2 251 041, 2 604 679, 2 627 680 and 2 810 246; U.S. Pat. Nos. 3 709 903, 3 784 599, 3 839 426, 3 933 787, 3 935 182, 3 996 282, 4 046 502, 4 103 092, 4 146 558, 4 153 598 and 4 213 897; and European published applications Nos. 13 751, 14 677, 14 678, 15 232, 15 233, 15 511, 16 726, 24 321, 24 322, 34 725, 38 299, 54 616, 56 574, 62 824, 62 825, 63 261 and 65 595. Particularly preferred cationic dyestuffs are those disclosed in published British Patent Applications Nos. 2 076 421A, 2 081 734A, 2 082 615A and 2 104 538A, British Pat. No. 2 019 873 and published European Application No. 41 040, the contents of which are incorporated herein by reference.

The dyed filler may be prepared by making the white pigment into a paste with water, or by dispersing it in water with the aid of a nonionic and/or cationic dispersing agent, the solids content of the resulting paste or dispersion being from 0.1% to 90% by weight, preferably 10–70%. To the stirred paste or dispersion is then added a 0.1–70% wt. aqueous solution, preferably a 5–40% solution, of the cationic dyestuff, at a temperature of 1°–100° C., preferably 20°–70° C. The required dyeing time is from 10 seconds to 60 minutes, a time of 1–20 minutes generally being sufficient. Optionally a conventional fixing agent may be used.

Alternatively, the dry white pigment may be mixed thoroughly with dry dyestuff in powder or granulate form, and the resulting mixture made into a paste with water or dispersed in water with the aid of a dispersing agent. The dyeing conditions are then the same as given above.

The resulting dyed pigment may be isolated e.g. by filtration, centrifuging or spray drying, and the product further washed and dried if required. Alternatively the dyed slurry may be used directly in the next step.

It is preferred that the substantivity of the dye to the filler is sufficiently high, and the weight ratio of dyestuff to filler is sufficiently low, that the aqueous-compositions of the invention contain no significant quantity of dyestuff which is not fixed on the filler.

In the preparation of the compositions according to the invention it is desirable to add 0.1–10% by weight of filler of a dispersing agent e.g. a polyphosphate or polyacrylate. Other suitable dispersing agents include condensation products or sulphonated aromatic compounds with aldehydes, e.g. condensation products of sulphonated naphthalene, diphenyl, diphenyl oxide and related products with formaldehyde. The preferred dispersing agents are condensation products of β-naphthalene sulphonic acid with formaldehyde, containing units of structure

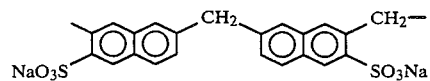

These dispersing agents, which are known, may also be used in combination with other dispersing agents such as polyacrylates, particularly when large amounts of dyestuff are used, or low viscosities must be attained.

If light shades of colour are required, the dyed filler may be mixed in suitable proportions with undyed white pigment. In this case it is preferred that the white pigment used is identical to the filler before dyeing.

The compositions according to the invention may contain any conventional aqueous binding agent, dispersion or emulsion, containing for example homo- or co-coplymers of monomers such as butadiene, styrene, acrylonitrile, isobutylene, vinyl esters, vinyl alcohol, vinyl halides, vinylidene chloride, acrylic esters, acrylamide, methylacrylamide and methylene-bis-acrylamide; or of urea-aldehyde, melamine or carbamate resins; or of starches, carboxyalkylcellulose and their derivatives; or of saponifiable maleinate resins.

Preferred binding agents for coating compositions, binder emulsions, printing inks and pastes include those based on acrylates, butadiene/acrylonitrile, styrene/butadiene, polyvinyl chloride, polyvinylidine chloride, polyvinyl alcohol, polyvinyl acetate and copolymers and mixtures of these, as described for example in German published application No. 2,938,896.

According to a further aspect of the invention, there is provided a process for the colouration of a substrate comprising a web of non-woven fibres, in which there is applied to the substrate a colouring composition comprising an aqueous paste or dispersion of a filler which has been dyed with a water-soluble polycationic dyestuff, together with a binding agent.

The process is preferably (a) the coating of paper or (b) colouration during the fixing of a non-woven fabric by addition of a binder dispersion containing the dyed filler or (c) dyeing or printing of a finished non-woven fabric using a printing ink or paste containing the dyed filler.

In the coating of paper, the coloured coating compositions may be applied to paper, which may itself be white or coloured, by any conventional coating process used in the paper industry. Coated paper dyed according to the present invention has good light fastness and excellent bleeding fastness for example to water, alcohol, milk or soap. Because of the high affinity of these dyestuffs for the filler there are practically no differential migration effects upon drying and level dyeings are obtained even when combinations of dyes are used.

The dyeing is carried out with a high yield and minimal pollution of equipment and waste water. If a cationic dye is added to a coating composition without being fully exhausted on to the filler, or if the composition contains a filler which has been dyed with an insufficiently substantive cationic dyestuff, the dyestuff which is in solution may cause agglomeration and thickening of the composition. The rheological properties of the composition may be so adversely affected that it is no longer possible to apply it by coating and the stability of the composition may be severely reduced. The present invention overcomes this disadvantage, resulting in excellent stability of the coating composition as well as good fastness properties in the dyed paper.

Paper dyed according to the process of the invention may be bleached without difficulty, in contrast to paper coated with compositions containing pigment dyes. This is of considerable importance for the recycling of dyed and coated waste paper.

Paper dyed according to the present invention takes print impression very well, and is exceptionally suitable as copying paper in xerography.

Binding, dyeing and printing of non-woven fabrics and tissue paper may be carried out by conventional means. The coloured non-woven fabrics so obtained are readily bleachable and have level dyeings with good bleeding- and light-fastness and a high colour yield. They are prepared with minimum pollution of equipment and of waste water. Problems of differential migration as between white and coloured filler do not arise if the same filler is used both dyed and undyed; similarly different coloured dyeings on the same filler will have the same migration properties.

Aqueous binder dispersions, printing inks and pastes containing the dyed fillers also show good stability.

The following Examples, in which all parts and percentages are by weight illustrate the invention:

EXAMPLE 1

285.7 Parts of a 35% aqueous dispersion of kaolin (English China Clay Ltd.), containing 100 parts kaolin dry weight, are stirred at room temperature (20° C.) and 10 parts of a 25% aqueous solution of the dye

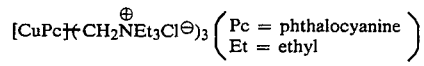

are added. After 2 minutes dyeing time 1.5 parts of a dispersing agent based on sodium polyacrylate (Polysalz F, BASF) are added, followed by 20 parts of a 50% solids synthetic binding agent based on butadiene/styrene (Dow-Latex 620). The pH is adjusted to 8.5 with 25% ammonia. A deep turquoise blue coating composition with a solids content of approx. 40% is obtained.

This composition is applied to uncoated paper of weight 80 g/m$^2$ by means of a doctor blade, at an application rate of 20 g dry substance per square meter. Finally the paper is dried in a convection drier at 105° C. for 60 seconds.

A level and deeply coloured coated paper is obtained, having excellent wet fastness to water and alcohol, as well as good light fastness.

EXAMPLE 2

Example 1 is repeated, but using as dyestuff 10 parts of a 20% aqueous solution of:

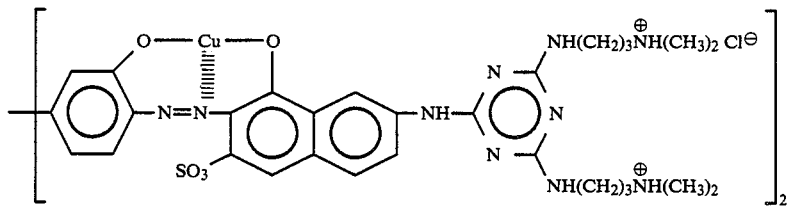

EXAMPLE 3

100 Parts chalk (Omyalite 90) is made into a paste with 185 parts water and homogenised with a Roth dispersor until a stable viscosity is obtained (approx. 10 minutes). The dyestuff shown in Example 2 (10 parts) is then added as 20% aqueous solution. After stirring for 5 minutes, 1 part dispersing agent (Polysalz F) is added, and after a further 2 minutes the dyed slurry is filtered.

The filter residue remains dyed deep blue and the filtrate practically colourless even after repeated washing with water. The product may be used as described in Example 1.

EXAMPLE 4

100 Parts of a 35% aqueous dispersion of kaolin (English China Clay Ltd.) are stirred at room temperature (20° C.) and 15 parts of the dyestuff solution of Example 1 are added. After 2 minutes dyeing time 1.5 parts of a dispersing agent based on sodium polyacrylate (Polysalz F, BASF) are added.

To 40 parts of this pigment slurry are added 40 parts water, 15 parts ethylene glycol and 5 parts of a binder dispersion containing 50% butadiene/styrene polymer (Dow Latex 620). The resulting printing composition is used to print tissue paper by the conventional flexoprint process or deep print process. A printing with good bleeding fastness to water, alcohol and milk is obtained without further heat treatment.

EXAMPLE 5

100 Parts of a 35% aqueous suspension of kaolin (English China Clay) are dyed with 15 parts of the dyestuff solution of Example 1. To 40 parts of this dyed pigment slurry are added 30 parts of an aqueous dispersion containing 46% polyacrylate binder (Primal E-32, Rohm & Haas) and 20 parts of a 10% solids starch solution.

The resulting printing paste is applied by the conventional deep print process to a non-woven fabric comprising 50% viscose, 25% polyamide and 25% cellulose fibres. The printed non-woven is dried for 60 seconds in a convection drier at 150° C., giving a blue print with good fastness to milk, water and alcohol.

EXAMPLE 6

100 Parts of a 50% suspension containing 25 parts kaolin (English China Clay), 25 parts chalk (Omyalite 90) and 50 parts water are stirred into 100 parts of a 5% solution of the dyestuff of formula

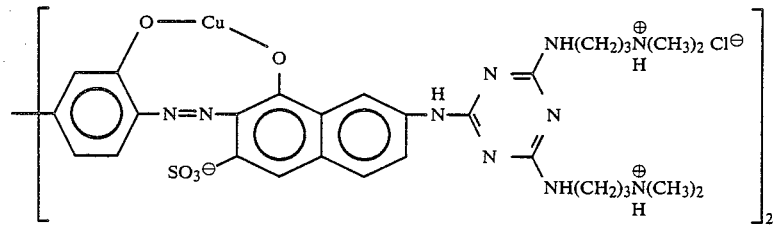

After stirring for 5 minutes, 1 part of the dispersing agent Polysalz F (as in Example 1) is added. 50 Parts of the resulting blue-dyed chalk/kaolin slurry are then stirred into 50 parts of an aqueous dispersion containing 47.5% butadiene/acrylonitrile binder (Perbunan N Latex 3415M), 3 parts of an ethoxylated alkylpolyalkylamine (heat sensitizer) are added, and the pH value is adjusted to approx. 7.

The resulting dispersion is used to impregnate a mechanically pre-fixed fibre mat consisting of cellulose and polyester fibres, at a pick-up of 200% of the dry weight of the mat. The impregnated mat is dried and the binder cured using a combination of infra-red lamps and a convection drier, giving a finished non-woven fabric, evenly coloured both on the surface and in section, easily bleached, and having good light fastness, rubbing fastness and excellent bleeding fastness to water and alcohol.

What is claimed is:

1. A colored composition comprising an aqueous paste or dispersion of a filler for paper or for nonwoven fabric, which filler has been dyed with at least one water-soluble polycationic dyestuff which is substantive to the filler and contains, per molecule, at least 1.3 cationic groups, said cationic groups being quaternary or protonated nitrogen atoms and being present in a total number which is at least one more than the total number of anionic groups which may be present, with the proviso that where the dyestuff is a 1:2 metal complex containing two dyestuff units per metal atom, each dyestuff unit contains at least 1.3 cationic groups, said composition containing no significant quantity of dyestuff which is not fixed on the filler.

2. A composition according to claim 1 in which the filler is kaolin, calcium carbonate or talc.

3. A composition according to claim 1 in which the dyestuff is biscationic.

4. A composition according to claim 1 in which the dyestuff is a 1:1 or 1:2 metal complex azo dye.

5. A composition according to claim 1 in which the dyestuff, as the metal-free cation, has a molecular weight of at least 400.

6. A composition according to claim 1 in which the dyestuff is a phthalocyanine dyestuff containing 2 or more cationic groups which are attached to the periphery of the phthalocyanine ring system.

7. A composition according to claim 1 in which the dyestuff has a substantially linear structure comprising three or more homo- or heteroaromatic rings or fused ring systems joined directly or by bridging groups in such a way that there are two terminal rings or ring systems and one or more medial ring or ring systems, there being on average at least 1.3 cationic groups per molecule attached to terminal rings or ring systems, and none elsewhere.

8. A composition according to claim 7 in which the dyestuff has one cationic group on each terminal ring or ring system and none elsewhere.

9. A composition according to claim 2 wherein the dyestuff is a metal complex of a biscationic dye and has a molecular weight of at least 400 as the metal-free cation.

10. A composition according to claim 1 containing a binding agent.

11. A composition according to claim 10 in which the binding agent is present in the amount of from 2% to 20% wt. of the total composition.

12. A composition according to claim 1 containing 0.1–10% by weight of filler of a dispersing agent.

13. A composition according to claim 12 in which the dispersing agent is a condensation product of β-naphthalene sulphonic acid with formaldehyde, containing units of structure

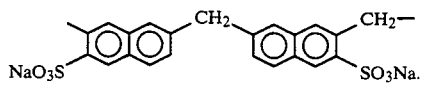

14. A composition according to claim 1 wherein the filler is a member selected from the group consisting of urea-formaldehyde condensation products, silicates, sulphates, carbonates, oxides, hydroxides, sulphides and sulphites.

15. A composition according to claim 3 wherein the filler is an inorganic filler selected from the group consisting of kaolin, talc, diatomite, French chalk, asbestine, calcium silicate, quartz sand, asbestos, gypsum, annaline, lenzine, calcium sulphoaluminate, barium sulphate, calcium carbonate, magnesite, whiterite, white lead, dolomite, calamine, alumina, bayrites, titanium dioxide, slaked lime, burned magnesia, zinc white, lithopone, zinc sulphide and calcium sulphite.

16. A composition according to claim 15 wherein the molecular weight of the metal-free cation portion of the dyestuff is 500 to 1000.

17. A composition according to claim 15 in which the dyestuff has a substantially linear structure comprising three or more homo- or hetero-aromatic rings or fused ring systems joined directly or by bridging groups in such a way that there are two terminal rings or ring systems and one or more medial rings or ring systems, there being one cationic group attached to each terminal rings or ring systems, and none elsewhere.

18. A composition according to claim 17 wherein the molecular weight of the metal-free cation portion of the dyestuff is 500 to 1000.

19. A composition according to claim 15 wherein the filler is selected from the group consisting of kaolin, calcium carbonate, talc, permanent white and titanium dioxide.

20. A composition according to claim 19 containing 0.1 to 10%, by weight of filler, of a dispersing agent.

21. A composition comprising a filler selected from kaolin, calcium carbonate, talc, permanent white and titanium dioxide, said filler having been dyed with at least one water-soluble polycationic dyestuff which is substantive to the filler and contains, per molecule, at least 1.3 cationic groups, said cationic groups being quaternary or protonated nitrogen atoms and being present in a total number which is at least one more than the total number of anionic groups which may be present, with the proviso that where the dyestuff is a 1:2 metal complex containing two dyestuff units per metal atom, each dyestuff unit contains at least 1.3 cationic groups, said composition containing no significant quantity of dyestuff which is not fixed on the filler.

22. A composition according to claim 21 wherein the polycationic dyestuff is water-soluble and has a molecular weight of 500 to 1000 in its metal-free cation portion.

23. A composition according to claim 1 wherein the molecular weight of the metal-free cation portion of the polycationic dyestuff is 500 to 1000.

24. A composition according to claim 1 wherein the filler has been dyed with a combination of polycationic dyestuffs as defined therein.

25. A composition consisting of white pigment having fixed thereon at least one polycationic dyestuff which is substantive to the filler and contains, per molecule, at least 1.3 cationic groups, said cationic groups being quaternary or protonated nitrogen atoms and being present in a total number which is at least one more than the total number of anionic groups which may be present, with the proviso that where the dyestuff is a 1:2 metal complex containing two dyestuff units per metal atom, each dyestuff unit contains at least 1.3 cationic groups.

26. A composition according to claim 25 wherein the metal-free cation portion of the polycationic dyestuff(s) is 500 to 1000.

27. A composition according to claim 25 wherein the pigment is selected from the group consisting of kaolin, calcium carbonate, talc, permanent white and titanium dioxide.

28. A composition according to claim 27 wherein the dyestuff is a metal complex of a biscationic dye and has a molecular weight of at least 400 as the metal-free cation.

* * * * *